Dec. 12, 1961 L. BERTRAND ET AL 3,012,862
SILICON PRODUCTION
Original Filed Nov. 6, 1957
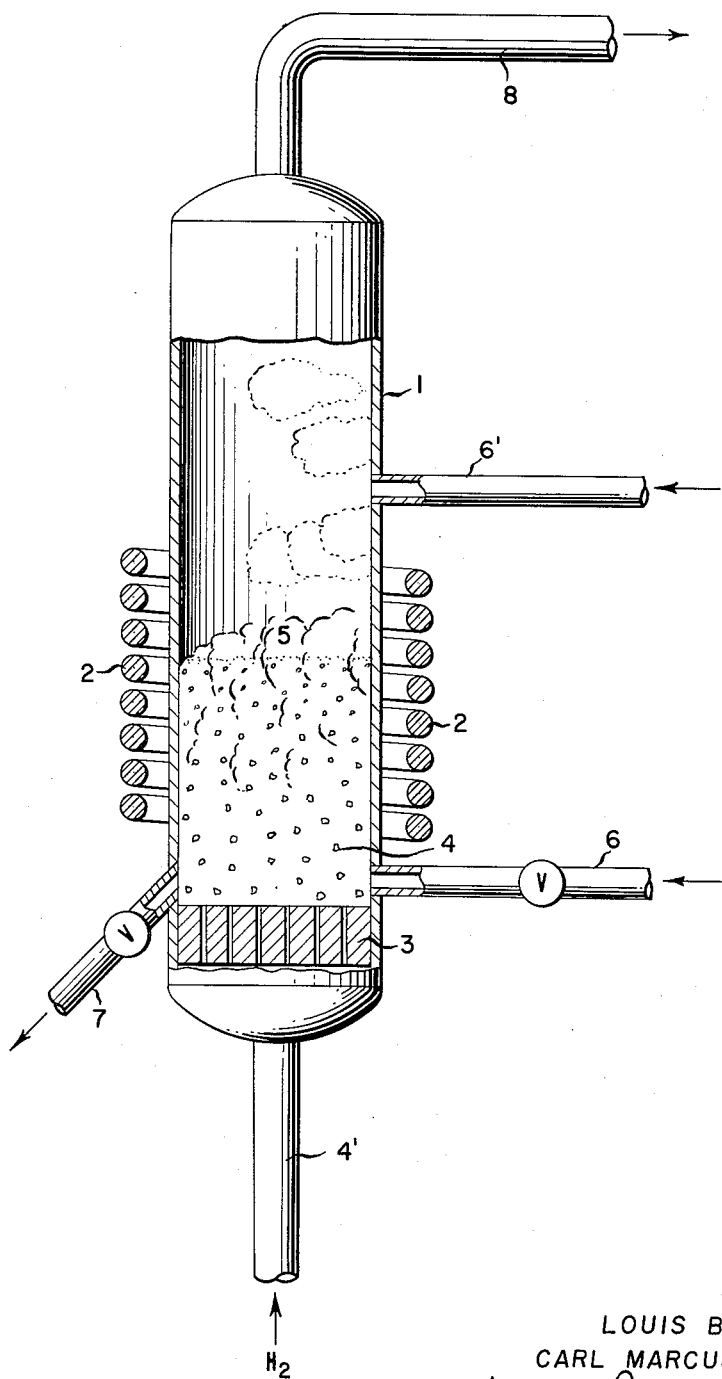
INVENTORS
LOUIS BERTRAND
CARL MARCUS OLSON
BY
ATTORNEY 3,012,862
Patented Dec. 12, 1961

3,012,862
SILICON PRODUCTION
Louis Bertrand, North Star, and Carl Marcus Olson, Newark, Del., assignors to E. I. du Pont de Nemours and Company, Wilmington, Del., a corporation of Delaware
Continuation of application Ser. No. 694,807, Nov. 6, 1957. This application Aug. 16, 1960, Ser. No. 50,041
16 Claims. (Cl. 23—223.5)

This invention relates to the production of elemental, high purity silicon, and more particularly to novel methods for the manufacture of such product. More specifically, it relates to new, commercially adaptable methods for producing pure elemental silicon possessing desirable electrical and semiconductor properties.

This application is a continuation of our copending application (now abandoned), Serial No. 694,807, filed November 6, 1957, which application is, in turn, a continuation-in-part of our parent application Serial No. 566,889, filed February 21, 1956, which is now abandoned.

Silicon can be prepared by reducing its various halides, such as the chloride, bromide, or iodide, at a relatively high temperatures. Because of the highly corrosive nature of the reactants and the reactivity of the silicon product at the prevailing reaction temperatures, rescourse is had to the incandescent wire deposition method in its preparation, especially when hydrogen is utilized as the reductant. This method comprises a batch or non-continuous type in which, though highly purified reactants are employed, the product deposited on the wire is disadvantageously always undesirably contaminated. This contamination arises from diffusion of tantalum or other wire material used into the product. In consequence, difficult, inefficient and costly separation and purification steps must be undertaken before one can obtain a product having the necessary purity characteristics to render it useful in electrical semiconductor applications.

It is among the objects of this invention to overcome these and other disadvantages characterizing prior methods for obtaining silicon and to provide novel procedures for accomplishing such objects. It is among the particular objects of the invention to provide an improved process for directly obtaining elemental silicon in a desired state of high purity and through the vapor phase reduction of a silicon halide with a reducing agent. A still further object is to provide an improved method for readily producing a semiconductor purity type elemental silicon and by a continuous, commercially adaptable method. Other objects and advantages of the invention will be apparent from the following description.

These objects are attained in this invention which comprises reacting in the vapor phase within a reaction zone in the presence of nucleating silicon particles maintained therein in fluidized suspension, a silicon halide, particularly a chloride, bromide, or iodide, with a reducing agent selected from the group consisting of hydrogen, zinc and cadmium.

In a more specific embodiment, the invention comprises continuously reacting silicon tetrachloride with hydrogen in a reaction zone maintained at temperatures ranging from about 950–1250° C. by charging vaporized silicon tetrachloride into a bed of finely divided ebullient particles of pure silicon maintained in fluidized state in said zone by said hydrogen, whereby elemental silicon formed in the reaction deposits on said particles, removing reaction by-products and unreacted hydrogen evolved from said bed, and recovering the resulting silicon product in the form of particles larger in size than said nucleating particles.

To illustrate the underlying principles and novel techniques characterizing the invention, description of one preferred adaptation entailing a continuous method for preparing high quality silicon will now be undertaken. In such application, a vertically disposed, cylindrical or tubular reactor can be employed which preferably is constructed of pure silica or any other corrosion resistant material adapted under the reduction reaction conditions to be non-reactive toward the reactants and reaction products. Suitable inlets and outlets, also corrosion resistant, are provided in the reactor so that a continuous operation with controlled introduction and withdrawal of the reactants and reaction products can be carried out. In the lower or bottom portion, below the high temperature section or reaction zone, a suitable perforated grid or supporting plate member, also constructed of a corrosion-resistant material, is provided through which gaseous reactants and/or fluidizing media can be readily introduced for passage upwardly in dispersed state through said reactor and reaction zone from a reactor inlet provided for such introduction. Said supporting member also functions, upon discontinuance of the fluidization, to retain in the reaction zone any finely divided silicon charged to or formed therein for recovery or otherwise should a batch or semi-continuous type of operation be undertaken. An electrical or other form of conventional heating element is associated with the reactor to maintain its reaction zone at any desired, appropriate temperature by external heating.

In operating such method, an apparatus of the type shown in the accompanying drawing can be utilized. Thus, a sufficient quantity of high-purity silicon, ground and sized to, say —60+100 mesh, can be first charged via inlet 6' to a conventional reactor 1, provided with electrical or other type of external heating means 2, and above a suitable apertured distributing plate member 3 disposed in the bottom of said reactor. A continuous flow of pure hydrogen from a supply source (not shown) is then passed upwardly into the reactor, at a lineal velocity of about .4 ft. per second (measured at room temperature) via a conduit 4' and through the plate member 3. In consequence, fluidization of the silicon particles 4 occurs and the bed 5 expands to about twice its static volume with its solid silicon particles being thrown into agitated ebullient motion to expose their entire surfaces for nucleating contact. Thereupon the bed is heated by means of furnacing element 2 to about 1000° C. Vaporized silicon tetrachloride from a valve-controlled separate inlet 6 is then charged as desired into the bottom of the reactor reaction zone and reacts with a portion of the hydrogen being fed to the system from conduit 4'. The mole ratio of hydrogen to silicon tetrachloride used is maintained at a relatively constant, high ratio, e.g., 60/1. Pure silicon forms in the ensuing reduction reaction to deposit on the fluidized nucleating silicon particles present in the reactor, causing said particles to grow or increase in size to the point where they no longer effectively fluidize at the prevailing gas velocities. For example, employing a 1' tubular reactor and a continuous gas flow of 1.3 liters per minute of hydrogen, measured at room temperature and pressure, silicon particles which reach a size greater than about 40 mesh will not fluidize effectively. For particles, equivalent in size to about 100 mesh screen opening, this growth represents a weight increase of about 15 to 20 times that of the original particles. The non-fluidizable silicon particles, upon reaching such size limit, can be continuously removed as formed from the reactor through a suitable valve controlled withdrawal outlet 7 to thus provide the desired continuous operation. Unreacted $H_2$ and reaction by-products are withdrawn from the top of the reactor via an outlet 8 to suitable condensers, separator or recovery equipment (not shown). In removing such oversize silicon material, some smaller particles also may be withdrawn. These can be recovered and reused in the system by treating the withdrawn material in associated, conventional type classifiers or separators (not shown), and fresh smaller silicon particles can be added to the recycled material being charged to the reactor. Thus, starting with a −40+100 mesh screen fraction of silicon particles, a continuous operation can be effected by intermittently or continuously withdrawing 40 mesh silicon material from the bottom of the reactor and recycling 100 mesh material after separating it from the withdrawn 40 mesh product.

To a clearer understanding of the invention, the following specific examples are given. These are illustrative in nature and are not to be construed as limiting the underlying principles of our invention.

*Example I*

To a 20 mm. I.D. quartz reaction tube provided with external heating means, having a heated reaction zone 10 inches in length, thirty grams of pure silicon was introduced from a source of supply in communication with said zone. The silicon had been screened to −60+100 mesh, and in a static condition after introduction occupied about 2¾ inches of the tube. The silicon fines were supported in the base of the tube on a pad of silica wool positioned just below the heating zone. Pure hydrogen gas from a continuous source of supply was then passed continuously into the bottom of the tube upwardly through the silica wool pad at the rate of 1.3 liters per minute (measured at room temperature and pressure) and silicon particles to result in fluidization and formation of a bed in which all the fines or particles are maintained in ebullient motion with the volume of the bed being expanded to 5–6 inches in the tube. Following such passage the hydrogen was removed from the reactor through an outlet maintained above the reaction zone and was recycled for reuse. The reaction zone was heated to 1040° C. and silicon tetrachloride vapor was then injected into the stream of hydrogen being charged at room temperature to the bottom of the reactor, by passing argon over the surface of boiling (62° C.) silicon tetrachloride at the rate of .01 liter per minute. The heat input to the boiler was controlled so that a total of 37.5 grams of silicon terachloride (the mole ratio of hydrogen to SiCl₄ being 63/1) was passed into the reactor over a period of about 4 hours. A yield of 13.7% of theoretical pure silicon deposited on the ebullient bed particles.

*Example II*

Using the same type apparatus, reactants, and (except as indicated below) flow rates as well as the same amount and type of silicon starting bed as used in Example I, with a hydrogen to silicon tetrachloride mole ratio of 59/1 and a reaction tube temperature 1220° C., the procedures of that example were duplicated. A yield of 34% pure silicon was deposited on the silicon bed particles.

*Example III*

Employing the same type apparatus and reactant gas flows used in Example II, that operation was duplicated but continued for 10.5 days at a reaction temperature of 1200° C. A total of 250 grams of silicon having a particle size in the range of −40 to +80 mesh was withdrawn from the reactor, with the −60 to +80 fraction (45 grams) of such withdrawn material being returned to the reactor during such period. The product silicon recovered was of exceptionally high purity, and when drawn into a single crystal possessed high resistivity and lifetime characteristics to become suitable for the most critical semiconductor uses, e.g., diodes, transistors, and rectifiers.

*Example IV*

Employing the same type apparatus and reactant flow rates used in Example I, that example was duplicated with hydrogen being used as the fluidizing gas and reducing agent for silicon tetrabromide. The silicon tetrabromide was vaporized at 155° C., using about .01 liter per minute of argon for sweeping vaporized silicon tetrabromide into the hydrogen stream. The reaction zone was maintained at 1000° C. After 4 hours' operation, the particles of silicon obtained were larger in screen size than those fed due to the silicon deposited from the reduction of the halide by hydrogen. A silicon yield of 50% was obtained, as measured by the silicon deposited on the fluidized particles.

*Example V*

Using the same type apparatus and reactants as were employed in Example II, and thirty grams of a −60+100 mesh silicon starting bed, that example was duplicated, with the reaction carried out at 1200° C. A total of 37.5 grams of silicon tetrachloride was charged into the reactor over a 7.5 hour period by passing argon over the boiling (62° C.) silicon tetrachloride at the rate of 5 milliliters per minute. The pure silicon product formed deposited on the silicon bed particles and represented a yield of 51% based on the silicon tetrachloride fed. The mole ratio of hydrogen to silicon tetrachloride feed was 107/1.

*Example VI*

To a tubular conical-bottomed reactor 18 inches in diameter and 9 ft. in height, provided with inlet and outlet conduits affording continuous operation, hydrogen preheated to 1000° C. was continuously passed upwardly through a plurality of openings near said conical bottom and through a bed of finely divided silicon particles which previously had been charged into said conical bottom from a source of supply. Hydrogen introduction was effected at a rate to provide an upward flow of 5 ft./sec. above said bed and to maintain the particles in fluidized state, such rate being equivalent to 100 moles of hydrogen per mole of silicon tetrachloride fed. The silicon tetrachloride vapor was continuously fed to the reactor at a rate of about 30.2 pounds per hour from a pressurized vaporizer held at 250° C. A small amount of unheated hydrogen was passed through the vaporizer to sweep the silicon tetrachloride continuously into the reaction zone in a stream completely separated from the fluidizing hydrogen. About 160 pounds of silicon particles, in the size range of about −30 to +60 mesh, were maintained in the bed by intermittently withdrawing a small portion thereof from the bed from near the bottom of the reactor. The withdrawn particles were sized and the fines portions were returned to the bed. The larger size particles (−30 to +40 mesh) were recovered as product material at the rate of 2.5# per hour, and represent about a 50% yield, based on silicon tetrachloride fed. The bed when expanded by the hydrogen flow was about 3½ feet high, and was maintained at 1200° C. by supplying additional heat through external heating of the walls of the reactor. Unreacted hydrogen, hydrogen chloride, and unreacted silicon tetrachloride withdrawn from the reactor were passed through a cooler and, after scrubbing with water, the residual hydrogen and separately recovered silicon halide by-products, including chloro-silicanes were repurified and recycled for reuse in the reactor. The product silicon was of extremely high purity and suitable for electric semiconductor uses.

*Example VII*

Using the same size tubular apparatus and flow rates of reactants employed in Example I, that example was duplicated except that silicon tetraiodide was employed in lieu of silicon tetrachloride. 160 grams of pure silicon tetraiodide was vaporized at 295° C. and charged to the reactor over a period of 10 hours, using a small portion of $H_2$ to sweep the iodide into the main hydrogen stream. The fluidized bed reaction zone was maintained at 950° C. during the run. 50% of the silicon fed as the iodide deposited on the silicon particles of the bed, and a pure silicon product was recovered from the run.

*Example VIII*

In this example, a 2-inch I.D. all-silica conical-bottom type of cylindrical reaction tube, 36 inches in height, having a reaction zone maintained at 950° C. by external heating is used. Above said zone a zone 3 inches in diameter and 12 inches in length is provided and is utilized as a disengaging space for fines. The latter zone is maintained at about 800° C. Pure zinc vapor, used as the reductant, is continuously fed from a boiler maintained at about 910° C., and a rate of 495 grams/hour, to the reactor through a silica inlet tube provided in and entering the bottom of the cone. Pure silicon tetrachloride vapor, diluted with argon, is separately and continuously passed into the reactor at a rate of 820 grams per hour and temperature of 900° C. through a silica tube disposed two inches above the bottom of the cone. 700 grams of high purity silicon particles, sized to $-30+60$ mesh and previously charged into the reactor is continuously fluidized therein by the silicon tetrachloride-zinc vapor reactant gas mixture, giving an ebullient bed depth of about two feet. The lineal velocity of said reactant gases, including also argon used for dilution purposes is .35 ft./sec. S.T.P. (measured at standard conditions of temperature and pressure). Unreacted gases and reaction by-products are continuously removed from the reactor through a discharge outlet provided above the reactor disengaging space. The product silicon formed during a 5-hour period of operation deposited on the silicon bed particles and represents a yield of 21%, based on the silicon tetrachloride fed to the reactor, with an equal amount of silicon fines being collected with reaction by-products. The said product is of high purity and suitable for use as a raw material for the manufacture of electric semiconductor devices.

*Example IX*

Using the same type of reactor employed in Example VII, an equal rates of silicon tetrachloride vapor, argon and silicon bed particles, equivalent weights of cadmium vapor at 770° C. were charged to the reactor while maintaining it at 950° C., with the disengaging space being maintained at 800° C. From this operation, a yield of 25% of silicon was deposited on the ebullient bed particles. The product silicon particles recovered were also found to be high-purity material.

*Example X*

A 3' high tubular reactor constructed of fused silica tubing 42 millimeters inside diameter and conical bottom was employed in this example. The reactor was provided with an inlet at the bottom (apex) of the cone for passage of the purified fluidizing reactant gas mixture upwardly through a porous plate positioned in the top of the conical section and into a heated reaction zone 9 inches in height. A conduit for removal of the by-product gases to suitable traps was located at the top of the reactor.

After a thorough reactor bakeout in argon at 1150° C., 50.3 grams of $-60+100$ mesh silicon particles were added to the reaction zone under a heavy argon purge to provide a bed about 1.8 inches deep when measured under static conditions. The particles were then fluidized, initially with argon and later with hydrogen as the reaction zone was heated slowly to 950° C. at which temperature the flow of hydrogen was reduced to 9.1 liters per minute, measured at room temperature, the bed being well fluidized.

A small additional amount (.35 liter per minute) of hydrogen was passed through an associated reservoir of $SiHCl_3$ maintained at 0° C., to entrain the $SiHCl_3$. This stream was mixed with the main hydrogen flow and fed into the bottom of the reactor. The reaction zone temperature was increased to and maintained at 1050° C. for 14 hours. During this period, the weight of the bed particles increased to 120.2 grams as a result of the deposition of 69.9 grams of silicon thereon. This corresponded to a yield of 32% based on $SiHCl_3$ fed, and to a production rate of 5 grams of silicon per hour. The mol ratio of hydrogen to trichlorsilane was 43:1 and the linear velocity of the gas through the reactor was about 1.6 ft./sec. Microscopic examination of the bed particles after reaction showed them to have a frosted appearance with curved features and slight nodular growths. This was in contrast to the original bed material which was very bright, and had sharp, angular features with no nodular growths.

The silicon material product recovered was highly suitable for use in fabricating electronic devices therefrom. Calculations indicated that the material had less than 2 parts per billion of boron and less than 3 parts per billion of phosphorous.

*Example XI*

Employing the same type of apparatus used in Example X, except that a mass of quartz fibers instead of the porous plate was used in the bottom of the tube to serve as a gas distributing device, and using the same start-up procedure, 80.2 grams of $-60+100$ mesh silicon particles were placed in the reactor. Using a thermocouple strapped against the outside wall of the reactor, a temperature of 1050° C. was maintained during the run, which continued for a period of 6¼ hours. The mole ratio of hydrogen to $SiHCl_3$ in the fluidizing gas feed was 20.2:1 and the linear gas velocity in the reactor at the operating temperature was 1.65 ft./sec. During the reaction, the bed increased in weight by 35 grams, which corresponds to a silicon yield 15.3% based on the $SiHCl_3$ fed, and a production rate of 5.6 grams per hour. The product silicon was satisfactory for use in electronic device manufacturing.

*Example XII*

In a further run similar to that effected in Example XI and using the apparatus described in that example, a yield of 39.3% high grade silicon product was recovered, operating at a temperature of 1075° C. at a mole ratio $(H_2/SiHCl_3)$ of 42:1 over a 14.5 hour period. The production rate was 5.6 grams per hour.

While described above as applied to certain specific embodiments, the invention, obviously, is not restricted thereto and due variance therefrom can be undertaken without departing from its underlying principles and scope. Thus, while we prefer to employ silicon tetrachloride or trichlor-silane as reactants, use is generally contemplated of inorganic silicon halide compounds, such as silicon halides selected from the group consisting of chlorides, bromides and iodides and halosilane compounds corresponding to the formula $SiH_{4-n}X_n$ wherein $n$ is an integer of 1 to 4 and X is a halogen selected from the group chlorine, bromine and iodine, as well as mixtures of such compounds. Specific examples thereof include silicon tetrachloride, silicon tetrabromide, silicon tetraiodide, trichlorosilane (silicon chloroform), $SiHCl_3$; tribromosilane, $SiHBr_3$; triodosilane, $SiHI_3$; dichlorosilane, $SiH_2Cl_2$; dibromosilane, $SiH_2Br_2$; chlorosilane, $SiH_3Cl$; bromosilane, $SiH_3Br$, iodosilane, $SiH_3I$, etc.

Similarly, althrough hydrogen comprises a particularly useful preferred form of gaseous reducing agent utilizable herein, other vaporous or vaporizable reducing agents including zinc and cadmium, as well as mixtures of such agents, can be effectively employed. As already noted, our preferred reducing agent comprises pure hydrogen and is used in large stoichiometric excess over the theoretical requirement for reduction of the silicon halide. The amount of hydrogen used, both as a reducing reactant and as the fluidizing medium for the nucleating silicon particles, though constant for a given set of operating conditions, can be varied widely under other conditions. For example, while a mole ratio of $H_2/SiCl_4$ or 60/1 has been indicated, this ratio may vary over a range of about 10/1 to 200/1. When ratios in the lower part of the indicated ranges are resorted to, sufficient inert fluidizing gas (argon, helium, etc.) can be used in conjunction with the reducer to insure effective, desired fluidization of the silicon particles. The ratios utilizable when employing the other types of reducing agents mentioned, e.g., vaporized zinc or cadmium, or mixtures of such agents are also variable. Usually these ratios are within the range of from about .5/1 to about 5/1 (moles of metal vapor reductant to moles of silicon halide). If desired hydrogen or an inert gas can be employed with such agents to assist in fluidizing the bed of silicon particles.

Again, while reaction zone temperatures ranging from about 950–1250° C. have been mentioned as particularly useful, the invention is not restricted thereto. In general, temperatures ranging from about 750–1350° C. can be advantageously employed, depending upon the silicon halide used or the reducing agent employed. When silicon tetrachloride or silicon chloroform is used, we prefer to employ temperatures ranging from about 950–1250° C.; with silicon bromide employment, we prefer to use temperatures ranging from about 900–1250° C.; and when resorting to silicon tetraiodide, temperatures of the order of about 800–1250° C. are adopted. When the metal reductants zinc and cadmium are used, the reaction zone is maintained above their boiling points.

While we have specified particular particle size ranges for the finely divided or pelletized, nucleating silicon particles and final silicon product, these size ranges are obviously not critical and can be suitably varied to conform to the particular gas velocities employed and the type and ultimate size of silicon product desired.

The vaporization of the silicon halide employed is carried out in a separate, closed boiler or reaction vessel conveniently associated with the closed main reactor. The halide can be heated to its boiling temperature in the boiler and then swept directly into the reaction zone of the reaction vessel. If preferred, it can be charged into a low temperature hydrogen stream being fed to such reactor. Alternatively, argon or other inert (helium, neon, etc.) gas can be used for this purpose, or in conjunction with the low temperature hydrogen through the boiling liquid halide, or through the vapor space above the vaporizer, as desired. Satisfactory vaporization of silicon tetrachloride can be had by passing a small flow of argon through the vapor space of the vaporizer. As it is convenient to operate slightly above atmospheric pressure, the $SiCl_4$ vaporizer is maintained at 62° C. Alternatively, flash vaporization of the silicon halide can be resorted to by dropping the liquid halide onto hot silica within a reaction vessel maintained at a temperature within the range of about 200–600° C. In this instance, we prefer to introduce the vaporized halide directly into the fluidized bed in the reaction zone of the main reactor so that premature reaction with hydrogen will be avoided.

The reaction bed depth can also be varied considerably. Thus, satisfactory operation on a small scale is obtained when a 2″ to 4″ bed (static measurement) is used and such bed is expanded to about 5″ to 8″ depth upon fluidization with hydrogen at a lineal velocity of .1 to .4 foot per second. For larger scale operations such as shown in Example VI a much deeper bed is employed together with a much higher gas velocity.

If desired, the reduction reaction can be carried out in a conveying fluidized bed of silicon particles. Deposition of the silicon takes place on the bed particles as they are conveyed through a relatively small diameter tubular reaction zone made of silica or other suitable refractory material. The fluidizing reactant gases, as for example $SiHCl_3$ and $H_2$, thus serve as the conveying gas mixture. As the particles are conveyed through the reaction zone they increase in particle size by deposition of silicon, and after they leave the reaction zone are separated from the by-product gas mixture, for example, by means of cyclone separation. The silicon particles are recycled until the desired product size is obtained. While many recyclings of the individual particles is required, the process is economical because of the very rapid reaction rate of the decomposition reaction, so that in small size readily heated reactors, a large production rate is achieved. The length of the reaction zone, the rate of travel of the silicon particles through it, the concentration and nature of the reactants, the ratio of silicon halide to solid silicon particles, the temperature of the entering particles, and the temperature of the reaction zone will determine the amount of deposition of silicon obtained on the particles per pass.

The refractory tubular reactor preferred for use herein is constructed of fused silica. It is obtainable in very pure form and its use minimizes any danger of silicon product contamination which might otherwise arise due to introduction of even trace amounts of impurities. The diameter and length of the reactor are variable and will depend upon the production rate undertaken and the gas velocities utilized. Conveniently, we maintain a vapor space above the fluidized bed equal to about ½ to 3 times the height of the bed so that solids blowover will be inhibited or eliminated and product recovery will be simplified with improved yield. The high temperature reaction zone should be at least as long as the expanded bed, and preferably, is of a somewhat longer order. Recourse to electrical resistance heating elements to externally heat the reactor is preferred on small scale operations, but other heating means, such as indirect gas firing, etc., can also be used in large scale operations if desired. The hydrogen and/or other reactants prior to introduction into the reactor can be preheated to near or above the contemplated reaction temperature, whereby little or no additional heat need be supplied through the walls of the reaction zone. When such hydrogen preheating or vaporization of zinc or cadmium as reducers is resorted to, the silicon halide reactant is introduced into the reaction zone through a separate conduit to avoid prereaction thereof.

The gas inlet means provided in the bottom of the reaction below the reaction zone comprises a tube smaller in diameter than the main reaction tube. If desired, the gaseous or vaporized reductant and vaporized silicon halide reactants can be introduced jointly or separately into the reactor through multiple inlets. Alternatively, hydrogen can be used in conjunction with and as a diluent for the zinc or cadmium reductants. It can be fed to the system as already indicated while at a relatively low temperature and with the silicon halide. The support element for the bed provided in the lower part of the reactor below the reaction zone also serves to distribute the gaseous reactants and fluidizing media charged into that zone. It can comprise a pad or layer of silica wool or similar non-reactive, porous material held in place by a suitable support element. In larger scale operations, a refractory checker work, or other suitable type of distributor bottom or element can be used.

The fluidizing gas or reactant is charged upwardly into and through the reaction bed. Unreacted reducing agent and reaction by-products are removed from the reactor above said bed and from the vapor space provided thereover. Reaction by-products, including hydrogen chloride (when hydrogen is used as the reductant), microfine silicon and any unreacted or partially reacted silicon halide are removed together from the reactor, and can be cooled and separated from the excess hydrogen by means of conventional adsorption, condensation, freezing and scrubbing treatments. By such treatments the hydrogen may be separated from the other reaction by-products, repurified and recirculated for reuse in the system. Furthermore, the other reaction by-products including such compounds as SiHCl₃, Si₂Cl₆ can be separately purified and returned to the reaction zone.

The reducing agents and silicon halide reactants employed in the invention are in highly purified state prior to use or reuse, and comprise readily available commercial materials.

The silicon particles employed as bed material and upon which deposition of silicon formed in the process is effected are made by crushing and sizing highly purified silicon from previous runs in the process or otherwise. Crushing or breaking up of the silicon particles is performed in such a way as to avoid contamination. For example, the particles suspended in a stream of inert gas or in the reaction by-product gas mixture may be impinged at high velocity on a hard surface, preferably of silicon, or other non-contaminating material. Fines so produced are then recycled to the reactor and utilized as the nucleation particles for further deposition. These particles grow to larger size during the process, and are recovered as the core or nucleus of the final particle. In continuous types of operation, additional small size nucleating particles are supplied through an inlet tube in the top of the reactor by dry feeder or by means of other desired mechanism as the larger particles formed in the process are withdrawn. Such withdrawal can be conventionally effected through a valved exit pipe positioned at or near the bottom of the fluidized bed, the particles being removed therethrough by suction or otherwise. In large scale operations the removal can be accomplished by gravity or by recourse to mechanical raking. The particles so removed can be sized and the smaller particles returned to the reactor.

The pure granular elemental silicon obtained in the invention is highly useful as a raw material in the preparation of semi-conductor devices, such as diodes, transistors, rectifiers, and the like. Because of its uniform granular size it is particularly useful for melting and drawing single crystals of silicon.

We claim:

1. A method for producing elemental silicon which comprises vapor phase reacting at temperatures ranging from 750–1350° C. and in the presence of fluidized, finely divided solid, pure, elemental silicon particles a vaporized inorganic silicon halide selected from the group consisting of a chloride, bromide and iodide with a reducing agent selected from the group consisting of hydrogen, zinc and cadmium, and recovering the silicon product formed in the process.

2. A process for producing elemental, high-purity silicon which comprises reacting in the vapor phase and at temperatures ranging from about 750–1350° C. an inorganic silicon halide the halogen component of which is selected from the group consisting of a chloride, bromide, and iodide, with a reductant selected from the group consisting of hydrogen, zinc and cadmium, effecting said reaction within a corrosion-resistant reaction zone wherein nucleating, finely divided pure, elemental silicon particles are maintained in fluidized suspension during the reaction, and separately removing from said zone the resulting silicon product and by-products of reaction.

3. A method for producing elemental silicon in a high state of purity which comprises reacting silicon tetrachloride with a reducing agent selected from the group consisting of hydrogen, zinc and cadmium vapor, within a closed reaction zone maintained at a temperature ranging from about 950–1250° C., effecting said reaction in the presence of a fluidized suspension of nucleating finely divided pure, elemental silicon particles maintained in said zone, and recovering the silicon product which is formed in the process.

4. A method of producing elemental silicon in a high state of purity which comprises reacting silicon tetrachloride with hydrogen as a reducing agent within a closed reaction zone maintained at a temperature ranging from 950–1250° C., effecting said reaction in the presence of a fluidized suspension of nucleating finely divided pure, elemental silicon particles maintained in said zone, and recovering the resulting silicon product formed in the process.

5. A method for producing elemental silicon in a high state of purity which comprises reacting trichlorosilane with hydrogen at a reducing agent within a closed reaction zone maintained at a temperature ranging from 950–1250° C., effecting said reaction in the presence of a fluidized suspension of nucleating finely divided pure, elemental silicon particles maintained in said zone, and recovering the resulting silicon product formed in the process.

6. A method for producing elemental silicon in a high state of purity which comprises reacting silicon tetrabromide with a reducing agent selected from the group consisting of hydrogen, zinc and cadmium, within a closed reaction zone maintained at a temperature ranging from 900–1250° C., effecting said reaction in the presence of a fluidized suspension of nucleating finely divided pure, elemental silicon particles maintained in said zone, and recovering the resulting silicon product formed in the process.

7. A method for producing elemental silicon in a high state of purity which comprises reacting silicon tetraiodide with a reducing agent selected from the group consisting of hydrogen, zinc and cadmium, within a closed reaction zone maintained at a temperature ranging from 800–1250° C., effecting said reaction in the presence of a fluidized suspension of nucleating finely divided pure, elemental silicon particles maintained in said zone, and recovering the resulting silicon product formed in the process.

8. A method for producing elemental silicon in a high state of purity which comprises reacting silicon tetrachloride with zinc vapor as a reducing agent within a closed reaction zone maintained at a temperature above the boiling point of zinc and to 1350° C., effecting said reaction in the presence of a fluidized suspension of nucleating finely divided pure, elemental silicon particles maintained in said zone, and recovering the resulting silicon product formed in the process.

9. A method for producing elemental silicon in a high state of purity which comprises reacting silicon tetrachloride with vaporized cadmium as a reducing agent within a closed reaction zone maintained at a temperature above the boiling point of cadmium and to 1350° C., effecting said reaction in the presence of a fluidized suspension of nucleating finely divided pure, elemental silicon particles maintained in said zone, and recovering the resulting silicon product formed in the process.

10. A method for producing elemental silicon in a high state of purity comprising continuously reacting silicon tetrachloride with hydrogen in a closed reaction zone maintained at temperatures ranging from about 950–1250° C., effecting said reaction by continuously charging vaporized silicon tetrachloride into a fluidized bed of finely divided particles of pure, elemental silicon maintained in said zone by means of the stream of hydrogen reductant being charged to said zone, and recovering the resulting silicon product from said zone as silicon particles no longer fluidizable therein.

11. A method for producing elemental silicon in a high state of purity comprising continuously reacting trichlorosilane with hydrogen in a closed reaction zone maintained at temperatures ranging from about 950–1250° C., effecting said reaction by continuously charging vaporized trichlorosilane into a fluidized bed of finely divided particles of pure, elemental silicon maintained in said zone by means of the stream of hydrogen reductant being charged to said zone, and recovering the resulting silicon product from said zone as silicon particles no longer fluidizable therein.

12. A process for producing elemental silicon in a high state of purity comprising fluidizing with hydrogen finely divided particles of pure, elemental silicon within a reaction zone of a silica reactor maintained at from 750–1350° C., passing a vaporous inorganic silicon halide the halogen component of which is selected from the group consisting of a chloride, bromide and iodide into the fluidized particles for reaction with a portion of said hydrogen and depositing the resulting silicon reaction product on said particles, removing reaction by-products from said reaction zone and separately recovering the resulting larger-sized silicon particles formed in said zone.

13. A process for producing pure elemental silicon through the vapor phase reduction of trichlorosilane with hydrogen, comprising passing vaporized trichlorosilane into a bed of finely divided, ebullient fluidized particles of pure elemental silicon maintained in a reaction zone at a temperature ranging from about 950–1250° C., reacting said trichlorosilane therein with said hydrogen and depositing the resulting elemental silicon product on said ebullient silicon particles, and recovering the larger elemental silicon particles formed as a result of said reaction and deposition.

14. A process for producing pure silicon by the vapor phase reduction of silicon tetrachloride with hydrogen, comprising passing vaporized silicon tetrachloride into a bed of pure, finely divided elemental silicon particles maintained at a temperature of 950–1250° C. in fluidized state within a reaction zone, reacting hydrogen therewith in said reaction zone and depositing the elemental silicon reaction product on said fluidized particles, and removing from said zone for recovery the elemental silicon product of increased size which forms as a result of said reaction and deposition.

15. A process for producing pure elemental silicon through the vapor phase reduction of silicon tetrachloride with a reducing agent selected from the group consisting of hydrogen, zinc and cadmium, comprising passing vaporized silicon tetrachloride into a bed of finely divided ebullient fluidized particles of pure elemental silicon maintained in said zone at a temperature ranging from about 850–1350° C., reacting said tetrachloride within said zone with said reducing agent and depositing the elemental silicon formed on said ebullient particles, recovering the elemental silicon particles of increased size formed as a result of said reaction and deposition, separately recovering and purifying said reducing agent from the reaction by-products, and recycling the purified agent for reuse in the system.

16. A process for producing pure elemental silicon through the vapor phase reduction of silicon tetrachloride with a reducing agent selected from the group consisting of hydrogen, zinc and cadmium, comprising passing vaporized silicon tetrachloride into a bed of finely divided ebullient fluidized particles of pure elemental silicon maintained in said zone at a temperature ranging from about 950–1250° C., reacting said tetrachloride within said zone with said reducing agent and depositing the elemental silicon formed on said ebullient particles, removing from said zone for recovery the resulting larger-sized silicon particles formed in said zone, separately removing from said zone reaction by-products formed therein, subjecting the latter to purification and recycling to the reaction zone the recovered purified reducing agent and silicon halide by-product for reuse in the process.

References Cited in the file of this patent

UNITED STATES PATENTS

| 2,340,974 | Myers | Feb. 8, 1944 |
| 2,600,253 | Lutz | June 10, 1952 |
| 2,709,676 | Krebs | May 31, 1955 |

OTHER REFERENCES

Lyon et al.: Journal of Electrochemical Society, vol. 96, No. 6, December 1949, pages 359–363.

FIAT Final Report 789, "Experiments To Produce Ductile Silicon," April 1946, pages 1–5.